United States Patent [19]
Porter

[11] Patent Number: 5,943,246
[45] Date of Patent: Aug. 24, 1999

[54] VOLTAGE DETECTION OF UTILITY SERVICE DISTURBANCES

[75] Inventor: David G. Porter, East Troy, Wis.

[73] Assignee: Omnion Power Engineering Corporation, East Troy, Wis.

[21] Appl. No.: 08/841,164

[22] Filed: Apr. 29, 1997

[51] Int. Cl.⁶ ........................................ H02H 3/24
[52] U.S. Cl. ............................ 364/528.28; 364/528.27; 702/60; 702/64; 307/43; 307/64; 307/86; 307/87; 361/86; 361/78; 361/90
[58] Field of Search .............................. 364/528.28, 178, 364/179, 184, 185, 187, 715.04, 528.21, 528.27, 528.29, 528.3, 528.31–528.33, 528.41; 702/57–67, 69–71, 73, 79, 124–126, 176, 182–185, 189, 193, 198; 340/660–663; 307/64, 43, 85–87, 80, 130; 361/92, 90, 91, 78, 86, 111; 324/141, 142, 76.15, 76.24, 76.42, 76.58; 323/282–285; 327/348, 349

[56] References Cited

U.S. PATENT DOCUMENTS 5,229,651  7/1993  Baxter, Jr. et al. ................. 364/528.32
5,319,514  6/1994  Walsh ........................................ 361/86
5,390,106  2/1995  Cederblad et al. ...................... 361/90

*Primary Examiner*—Hal Dodge Wachsman
*Attorney, Agent, or Firm*—Andrus Sceales Starke & Sawall

[57] ABSTRACT

A digital voltage detector uses a running average to detect utility service disturbances in real time. An isolation transformer taps the main electrical AC power supply line and provides an analog voltage waveform to a system controller. The analog waveform is sampled digitally in real time, and the samples are squared to create respective instantaneous squared voltage values. A running average is kept of the instantaneous squared voltage values for a preselected period of time, preferably one half-cycle for the main power supply waveform. The running average is compared to a preselected under-voltage threshold value and a preselected over-voltage threshold value, and a disturbance detection signal is generated if the running average violates either threshold value. The disturbance detection signal is preferably used to activate a standby electrical AC power supply, and contemporaneously to disable the main electric AC power supply.

29 Claims, 4 Drawing Sheets

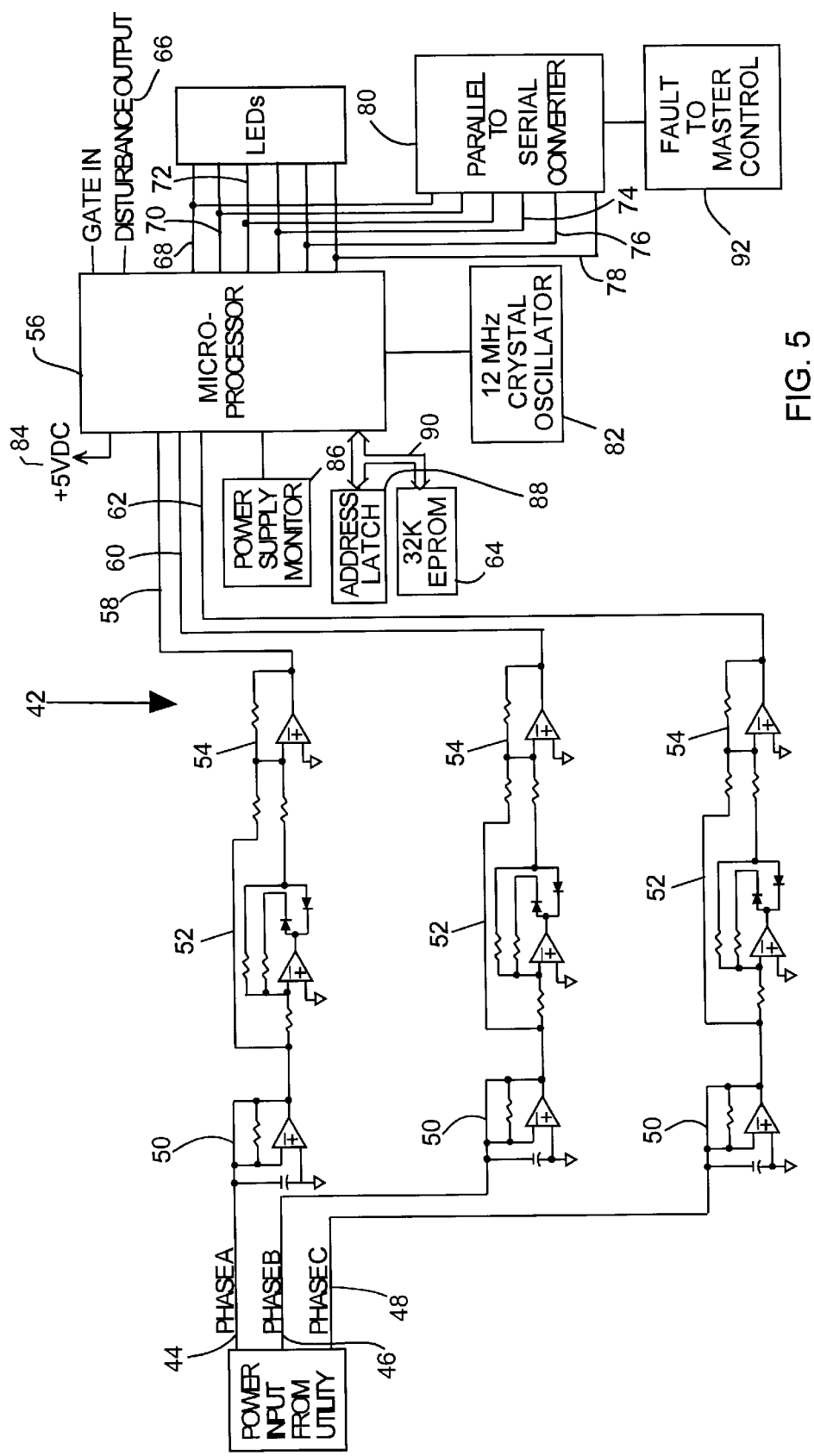

VOLTAGE DETECTION OF UTILITY SERVICE DISTURBANCES

FIELD OF THE INVENTION

The invention detects utility service disturbances that may affect critical loads, such as sensitive electronic equipment. More specifically, the invention relates to detecting power outages, momentary interruptions, voltage sags and swells and other disturbances of commercial AC power supplied by utilities.

BACKGROUND OF THE INVENTION

Utility power disturbances and momentary power interruptions degrade power quality and can adversely affect the operation of sensitive electronic equipment. Even momentary interruptions of just a few cycles can result in unscheduled controller resets, shutdown of a factory assembly lines, loss of computer data, etc. Thus, loss of electric power for only a short time can be detrimental by factory downtime, product damage and reduced productivity, etc.

The solution is to provide a system that continuously monitors power quality for power outages, momentary interruptions, voltage sags and swells, and switches sensitive loads from the utility service to an alternate standby power source when a power disturbance is detected. It is desirable that the switching take place as quickly as possible so sensitive electronics in the critical load are not affected.

Prior art methods of detecting voltage fluctuations and momentary interruptions include the template method and the three-phase to two-phase transformation methods. These methods can be inaccurate and are not as robust as the present invention.

SUMMARY OF THE INVENTION

The invention provides a practical method of quickly and accurately detecting utility service disturbances. It uses a modified RMS processing technique, and is especially well-suited for use in uninterruptable power supplies.

More specifically, the method involves the use of an isolation transformer to provide an analog signal representing line voltage in the main electrical power supply line. Digital samples are taken to generate a plurality of instantaneous voltage magnitude values ($V_i$) at a preselected sampling rate. The preferred sampling rate is approximately 40 cycles per half-cycle of the main power supply waveform. The instantaneous voltage magnitude values are each squared in real time to create respective instantaneous squared voltage values $(Vi)^2$ for each sampling period. A running average of the $(Vi)^2$ value is generated by accumulating the instantaneous squared voltage values $(Vi)^2$ for a preselected period of time which is referred herein as an accumulation window of time. The running average, referred to herein as the running voltage value RVV, is adjusted in real time by subtracting the instantaneous squared voltage value $(V_{i-41})^2$ for the sampling period immediately prior to the start of the accumulation window and by adding the instantaneous squared voltage value $(V_1)^2$ for the most recent sampling period. The running voltage value is then compared to a preselected under-voltage threshold value $K_{min}$, and also preferably to a preselected over-voltage threshold value $K_{max}$. If the running voltage value sags to or below the preselected under-voltage threshold value $K_{min}$ or swells to or exceeds the preselected over-voltage threshold value $K_{max}$, a disturbance detection signal is generated to switch the system to the standby electrical AC power supply.

The preselected under-voltage threshold value $K_{min}$ and the preselected over-voltage threshold value $K_{max}$ are selected in accordance with appropriate tolerance levels for the quality of power supplied. Preferably, the threshold values are determined by multiplying the number of samples per accumulation window times the square of the normalized voltage tolerance.

In order to promote system response, it is desirable that the accumulation window of time be as short as reasonable. In order to eliminate AC ripple effects in the running voltage value, it is desirable that the running voltage value be generated by accumulating the instantaneous squared voltage values $(V_i)^2$ over integer multiples for the half-cycle of the main power supply waveform (i.e. the accumulation window approximates an integer multiple of the half-cycle for the main power supply waveform). Otherwise, the preselected under-voltage threshold value $K_{min}$ and the preselected over-voltage threshold value $K_{max}$ may have to be adjusted to account for AC ripple in the running voltage value. Therefore, it is preferred that the accumulation window be defined as one half-cycle for the main power supply waveform.

The invention can be carried out in a system in which the main electrical AC power supply is single-phase, and can also be carried out in a system where the main electrical power supply is three-phase, as long as each phase is treated independently from the other phases.

In the preferred embodiment of the invention, the analog isolated voltage signal from the isolation transformer is scaled and rectified to generate a half wave rectified sinusoidal waveform having a preselected peak voltage (e.g. 0 to +4 volts). An A/D converter located in a system microprocessor converts the analog half wave rectified sinusoidal waveform into digital values representing the instantaneous voltage magnitude values $V_i$ at the respective sampling period which are used by the microprocessor to generate the running voltage value. The scaling and rectifying of the analog isolated voltage signal is desirable so that reasonable resolution can be achieved by an 8-bit A/D converter. Scaling and rectifying make this possible because the A/D converter need not be concerned about negative values and 0.

The invention provides effective protection against utility service disturbances by accurately and quickly detecting under-voltage and over-voltage conditions. The invention does not require synchronization, and is robust in the presence of harmonics, phase variations and frequency variations. In addition, the preferred embodiment of the invention operates in real time without requiring substantial processing power (e.g. an 8-bit microprocessor is useable).

Various other features, objects and advantages of the invention will be made apparent from the following drawings and detailed description.

BRIEF DESCRIPTION OF THE SEVERAL VIEWS OF THE DRAWINGS

FIG. 5 is a schematic drawing showing a control board for the UPS shown in FIG. 2.

DETAILED DESCRIPTION OF THE DRAWINGS

Figure 1A:
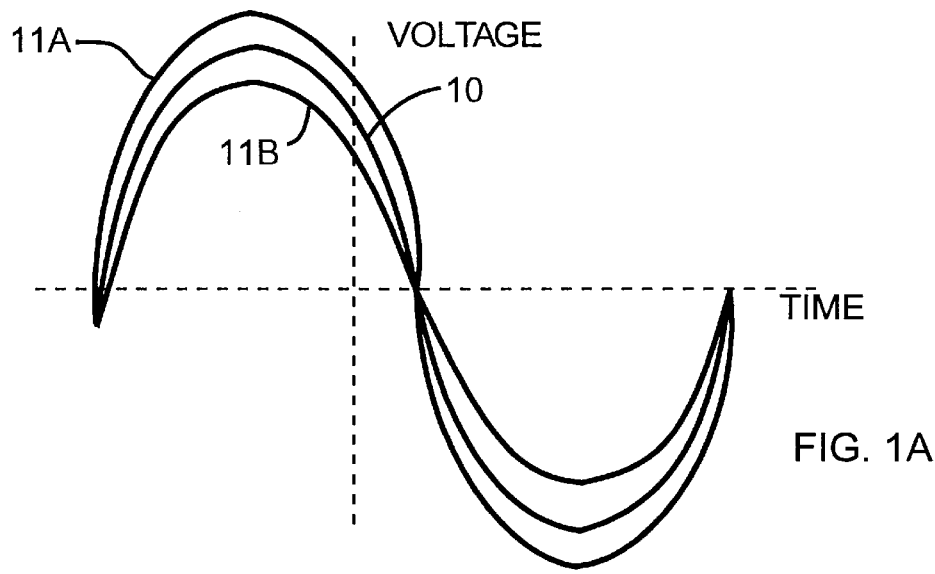
FIG. 1A is an illustration comparing a normal AC voltage waveform to both a sagging AC voltage waveform and a swelled AC voltage waveform.
Figure 1B:
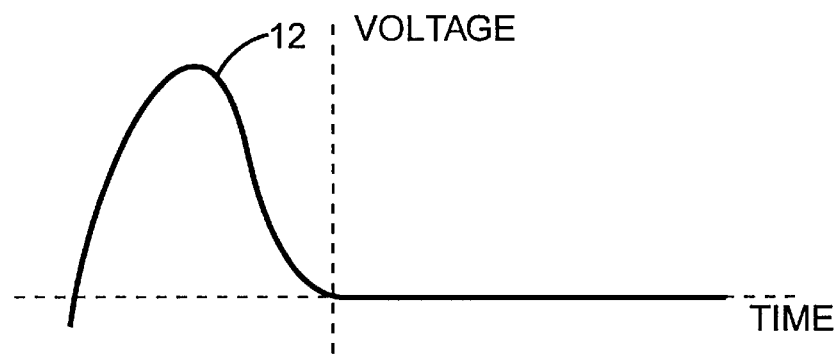
FIG. 1B is an illustration of an AC voltage waveform during a power outage.

In FIG. 1A, the waveform labelled with reference numeral 10 illustrates one cycle of a normal AC voltage input signal 10 from a utility power line (i.e. 120 VAC, 60 Hz sine wave). The waveform labelled with reference numeral 11A illustrates one cycle of a swelled voltage input signal 11A, and the waveform labelled with reference numeral 11B illustrates one cycle of a sagging AC voltage input signal 11B. FIG. 1B illustrates the AC input signal of FIG. 1A during a power outage. In FIG. 1B, voltage is lost in the first half-cycle prior to reaching the peak of the sinusoidal waveform, and the voltage falls to zero. The voltage input signal 12 does not typically drop to zero immediately because the circuit maintains residual voltage for a short period of time.

Figure 2:
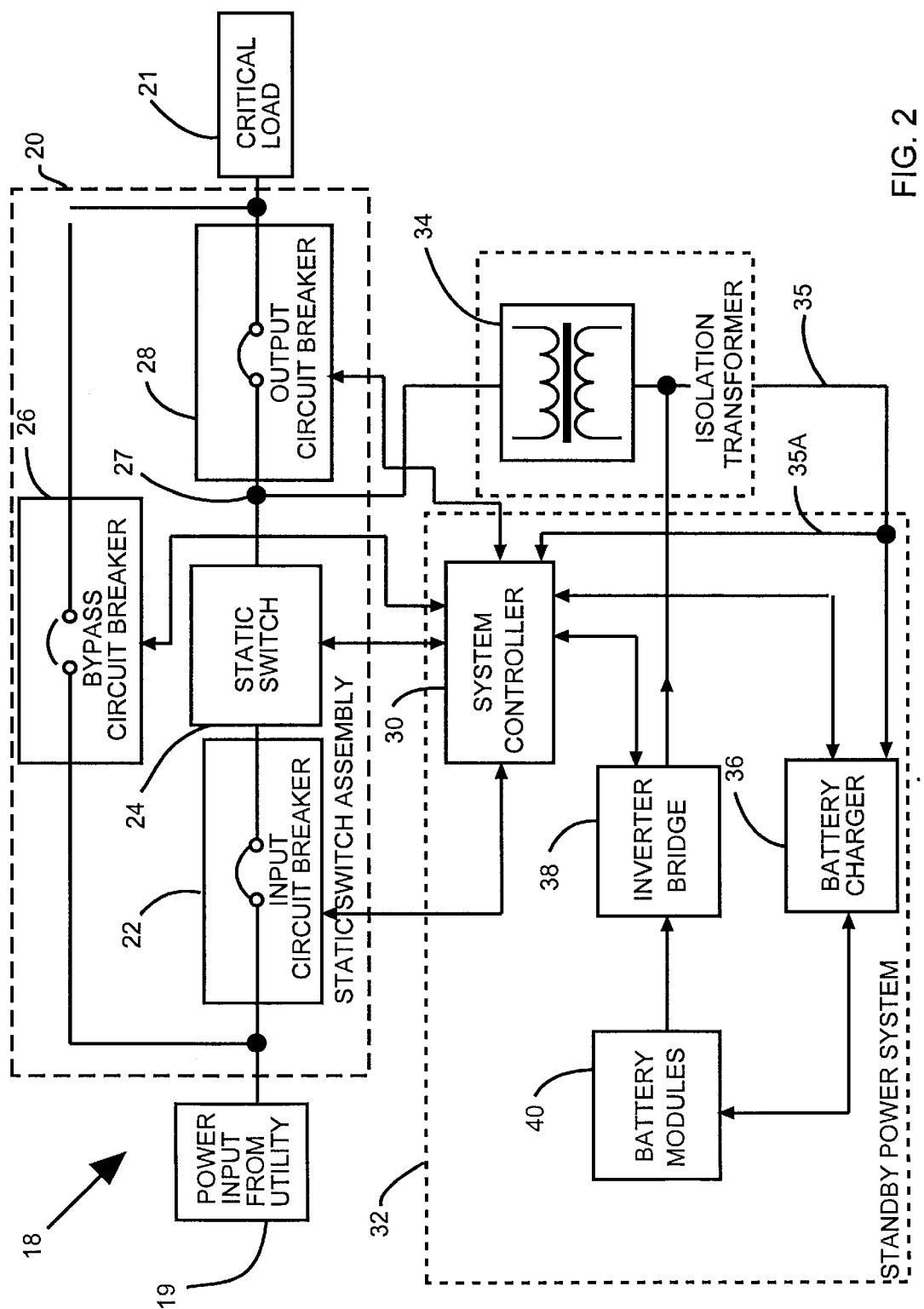
FIG. 2 is a block diagram showing an uninterruptable power supply (UPS) for detecting utility service disturbances and transferring power from utility service to a standby power source after detecting a power disturbance.

Referring to FIG. 2, an uninterruptable power supply (UPS) 18 in accordance with the invention monitors, detects and transfers power from a main utility service 19 to an alternate standby power source 32 when a utility power disturbance is detected (e.g. when a power outage, a momentary interruption, or significant voltage sag or swell is detected). The UPS 18 is able to switch sensitive electrical loads 21 (i.e. critical load) from the utility service 19 to the standby power system 32 in approximately one-quarter cycle.

The UPS 18 includes a static switch assembly 20, an isolation transformer 34 as well as the standby power system 32. Commercial AC power enters the UPS 18 through line 19 into the static switch assembly 20. The static switch assembly 20 contains an input circuit breaker 22, a static switch 24 and an output circuit breaker 28. The static switch 22 includes a set of SCRs (silicon controlled rectifiers, not shown) as is well known in the art. Under normal operating conditions, input circuit breaker 22 and output circuit breaker 28 are closed and the SCRs within static switch 24 are on. Therefore, under normal operating conditions, electrical AC power is supplied from utility power line 19 through the static switch assembly 20 to the critical load 21. The static switch assembly 20 also has a static switch bypass circuit breaker 26 that is normally open under normal operating conditions but can be actuated to override the UPS 18.

The input circuit breaker 22, the static switch 24, the output circuit breaker 28 and the bypass circuit breaker 26 are all monitored and controlled by a system control 30 for the standby power system 32. The standby power system 32 contains the system control 30, battery modules 40, an inverter bridge 38, a battery charger 36, and associated circuitry. The battery charger 36 converts AC power in line 35 from a bidirectional isolation transformer 34 to DC power. The isolation transformer 34 protects the UPS 32 from common mode and normal mode transients. DC power flows from the battery charger 36 to battery modules 40 in order to charge batteries 40. The inverter bridge 38 converts DC power from the battery module 40 into AC power when a power disturbance is detected, thus maintaining power to the critical load 21. AC power from the inverter bridge 38 is transmitted to an isolation transformer 34 which steps up the voltage of the AC power and transmits AC power to the static switch assembly 20 in the line between the static switch 24 and the output circuit breaker 28 (i.e. tap location 27).

The isolation transformer 34 generates an isolated voltage signal in line 35 in response to the voltage in the utility AC power line at tap location 27. The isolated voltage signal 35 is used to provide AC power to the battery charger 36, and is also used to provide analog input through line 35A to the system controller 30. If the system controller 30 detects a utility service disturbance in the isolated voltage signal, the static switch 24 SCRs are turned off and the inverter bridge 38 is turned on to switch the load to the standby power system 32.

Figure 3:
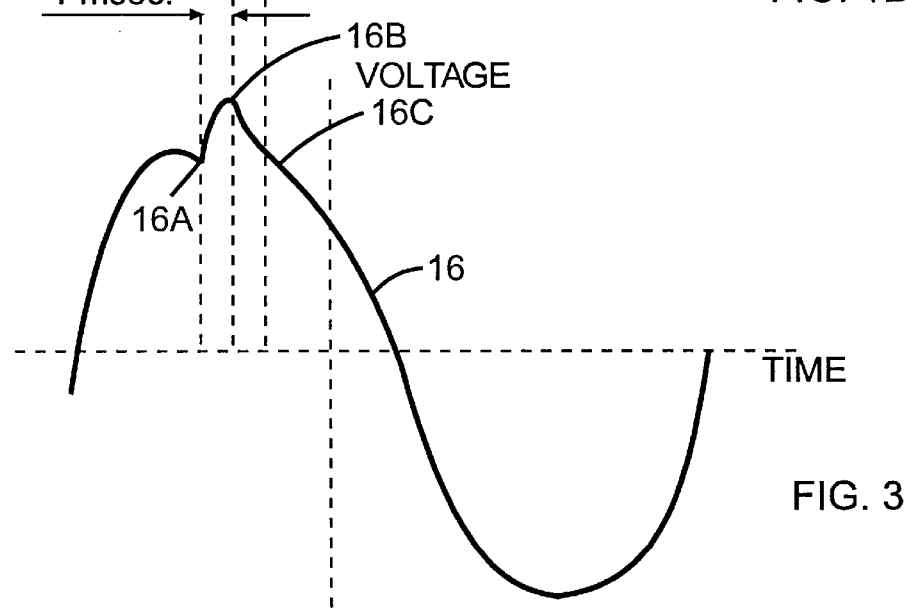
FIG. 3 is an illustration of the AC output power waveform fed to a critical load upon switching to a standby AC power source.

The waveform 16 in FIG. 3 illustrates the output signal waveform to the critical load 21 upon switching to the standby power system 32. The voltage disturbance is detected at point 16A of FIG. 3. The SCRs of static switch 24 must be commutated to be turned off. This is accomplished by bringing the load voltage above the utility voltage for a short period of time, approximately 1 millisecond, to commutate the SCRs. Thus, after a slight electronic delay (100 milliseconds), the voltage rises and overshoots the utility voltage for a period of about one millisecond (1 ms) to a peak voltage at point 16B in FIG. 3 to turn off the stator switch 26. Once the SCRs of static switch 24 have been commutated (i.e. turned off), the voltage returns to normal as shown at point 16C in FIG. 3. It takes approximately one millisecond for the voltage to drop down from the peak value 16B to the normal operating value 16C of the utility voltage. The time period from detection until transfer over to the standby power system 32 from the utility takes approximately 2 milliseconds. Thus, if the commercial power fails, the inverter bridge 38 turns on and begins supplying AC power to the critical load 21 after a delay of approximately 2 milliseconds (i.e. approximately ¼ of the half-cycle for the main power voltage supply waveform).

Figure 4:
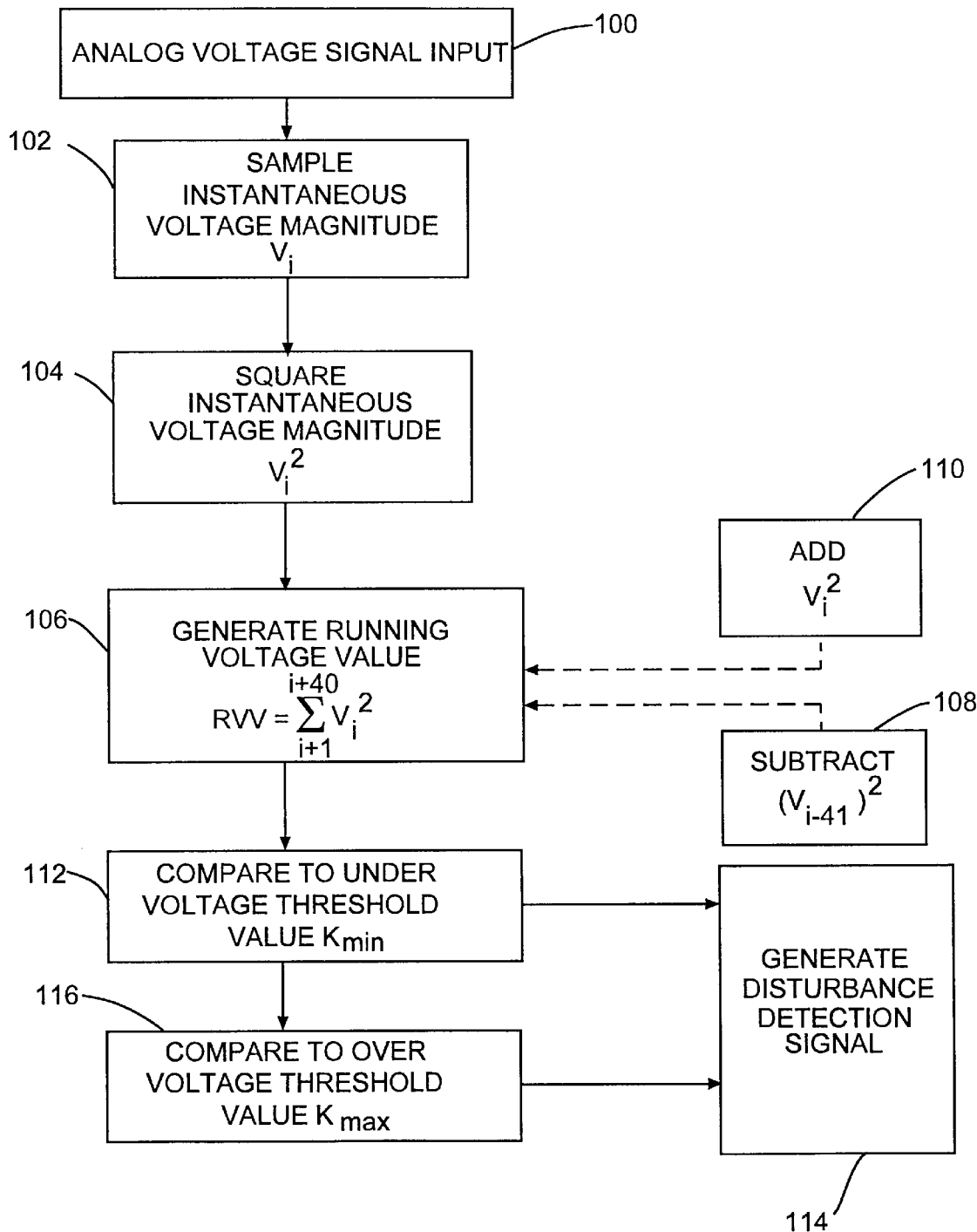
FIG. 4 is a flowchart illustrating a voltage detection technique in accordance with the invention.

FIG. 4 is a flowchart illustrating the preferred voltage disturbance detection technique implemented by the system controller 30. In FIG. 4, the disturbance detection technique is illustrated for detecting a disturbance in a main electrical AC power supply that is single-phase. The technique can also be used to detect disturbances when the main electrical power supply is three-phase by performing each of the steps described in FIG. 4 independently for each phase.

In FIG. 4, block 100 depicts an analog voltage signal input which is generated by the isolation transformer 34 in response to the voltage in the main electrical AC power line 27. The system controller 30 samples the analog voltage signal input at a preselected sampling rate (e.g. 40 cycles per waveform half-cycle) to generate digital data representing the instantaneous voltage magnitude for each respective sampling period, $V_i$, as depicted by block 102. Each of the instantaneous voltage magnitude values $V_i$ are squared in real time to create respective instantaneous squared voltage values $(V_i)^2$, block 104. The respective instantaneous squared voltage values $(V_i)^2$ are accumulated, block 106, to generate a running voltage value (RVV), which is a running average of the instantaneous squared voltage values $(V_i)^2$ for a preselected number of sampling periods (e.g. 40):

$$RVV = \sum_{i+1}^{i+40} (V_i)^2 \qquad \text{(Eq. 1)}$$

The preselected number of sampling periods (e.g. 40) is referred herein as an accumulation window of time. It is preferred that the accumulation window for determining the running voltage value RVV be generated by accumulating the instantaneous squared voltage values, block 104, over integer multiples for the half-cycle of the main power supply waveform, voltage tap 27. Although the invention does not require selecting the accumulation window in accordance with integer multiples of the half-cycle, AC ripples will appear in the running voltage value, block 106, unless it is selected in this manner. In order to promote system response, it is preferred that the accumulation window for the running voltage value RVV be one (1) half-cycle of the main power supply waveform. Using an accumulation window of two half-cycles, or even three half-cycles may be desirable, but system response will be compromised.

The running voltage value RVV is adjusted in real time during each sampling period by subtracting the instantaneous squared voltage value $(V_{i-41})^2$ for the sampling period immediately prior to the start of the accumulation window for the running voltage value RVV, block 108, and by adding the instantaneous squared voltage value for the most recent sampling period $(V_i)^2$ to the running voltage value RVV, block 110. The running voltage value RVV is compared to a preselected under-voltage threshold value $K_{min}$, block 112. It is preferred that the running voltage value RVV be compared to the under-voltage threshold value $K_{min}$ every sampling period, however, in some circumstances it may be desirable to compare intermittently. If the running voltage value RVV sags to or below the under-voltage threshold value $K_{min}$, the system controller 30 generates a disturbance detection signal, block 114. In a similar manner, the running voltage value RVV is compared to an over-voltage threshold value $K_{max}$, block 116. If the running voltage value RVV swells to or exceeds the over-voltage threshold value $K_{max}$, the system controller 30 generates a disturbance detection signal, block 114.

The under-voltage threshold value $K_{min}$, block 112, and the over-voltage threshold value $K_{max}$, block 116, are preselected and are chosen primarily in accordance with the operating tolerance of the critical load 21, FIG. 2. In particular, the threshold values $K_{min}$ and $K_{max}$ can be determined by multiplying the number of sampling periods per accumulation window (e.g. 40) times the square of a normalized voltage tolerance level (e.g. $K_{min}$ approximately equal to $(0.9)^2$; $K_{max}$ approximately equal to $(1.1)^2$). It may be desirable to slightly adjust the threshold values $K_{min}$ and $K_{max}$ because of AC ripples in the running voltage value RVV. In practical systems, AC ripples are normally present in the running voltage value RVV, block 106, because it is difficult to exactly match the accumulation window to a precise integer multiple of the half-cycle for the main power supply waveform.

Referring now to FIG. 2 in addition to FIG. 4, at system start-up, the system controller 30 does not turn on the static switch 24 until the system controller 30 has run the method described in FIG. 4 for at least one full accumulation window of time.

FIG. 5 illustrates a schematic of a control board 42 within the system control module 30 of the UPS 32. Input power from the utility enters the control board 32 through phase A input 44, phase B input 46, and phase C input 48. All three phases of the utility power enter through inputs 44, 46, 48 and into voltage scaling circuitry 50 where the input voltage waveforms 44, 46, 48 are scaled down to a 4-volt peak sine wave. The 4-volt peak sine wave input voltages enter analog absolute value circuitry 52 and a rectifier 54. The analog absolute value circuitry 52 and the rectifier 54 converts the 4-volt peak sine wave input power voltages to a voltage waveform that consists entirely of positive values, i.e. 0 to +4 volt half-wave rectified sine waves. The 0 to +4 volt half wave rectified sine waveform enters microprocessor 56 through A/D inputs 58, 60, 62. The microprocessor is preferably an Intel 87C51GB. The microprocessor is an 8-bit microprocessor which performs the steps illustrated in FIG. 4. The software code for instructing the microprocessor is embedded in firmware within 32K EPROM 64. An assembly language listing of the subroutines used to instruct the microprocessor 56 is set forth in Appendix A.

Once a utility service disturbance is detected by the control board 42, a low level digital output signal is transmitted from microprocessor 56 as a disturbance detection signal 66 to signify the presence of a disturbance in the main power supply line 27. Microprocessor 56 also includes six parallel outputs for signalling over-voltages or under-voltages on each of phases A, B and C of the power input signals 44, 46, 48. The phase A over-voltage is in line 68; the phase A under-voltage is in line 70; the phase B over-voltage is in line 72; the phase B under-voltage is in line 74; the phase C over-voltage is in line 76; and the phase C under-voltage is in line 78. These lines 68, 70, 72, 74, 76 and 78 are electrically connected to six separate LEDs to warn an operator of a disturbance on phases A, B or C. The output on lines 68, 70, 72, 74, 76, 78 is also transmitted to a parallel to serial converter 80. The parallel to serial converter 80 transforms the parallel inputs 68, 70, 72, 74, 76, 78 to a single serial output 92 which is sent to a master control.

A 12 MHz crystal oscillator 82 supplies a clock signal to the microprocessor 56. A precision +5 volt DC reference 84 is supplied to microprocessor 56 for reference. A DC power supply monitor 86 monitors DC power supplied to the control board 42, and is electrically connected to microprocessor 56. Input of the data and software code into microprocessor 56 is accomplished by address latch 88 which controls the flow of data and code into and out of microprocessor 56 through data bus 90.

As mentioned previously, the analog voltage waveform for phases A, B and C are input into the control board 42 and are transmitted sequentially to the voltage scaling circuitry 50, the absolute value circuitry 52 and the rectifying circuitry 54 to result in a 0 to +4 volt half wave rectified sine wave. The 0 to +4 volt half wave rectified sine waveform is transmitted to an A/D converter in microprocessor 56. Because the microprocessor 56 does not need to account for negative voltage amplitudes or zero crossings within the 0 to 4 volt half wave rectified sine wave, reasonable resolution can be achieved using an 8-bit microprocessor.

The invention has been shown in the drawings and described herein as a voltage detector for detecting utility service disturbances in conjunction with an uninterruptable power supply, but the method of detection may be useful in other applications not involving uninterruptable power supplies. For instance, a disturbance detector in accordance with the invention may be used in other voltage monitoring applications.

While the invention has been described with reference to a preferred embodiment, those skilled in the art will appreciate that certain substitutions, alterations and omissions may be made without departing from the spirit thereof. Accordingly, the foregoing description is meant to be exemplary only, and should not be deemed limitative on the scope of the invention set forth with following claims.

APPENDIX A

---

04/21/1997  13:55  Filename: ANAINT.ASM $TITLE (    ANAIWT.ASM    ON C:\DEVSYS\ OF DGP COMPUTER)
$DATE
$PAGEWIDTH=120
$PAGINATE
$ALLPUBLIC
;
;
;
;       THIS PROGRAM SEGMENT IS THE ANALOG INTERUPT ROUTINE
;       WHERE THE PROGRAM GETS THE NEXT DATA AND DOES AN
;       RMS CALCULATION ON THE DATA.
;       PROGRAM WRITTEN BY D. Porter OF
;       OMNION POWER ENGINEERING CORPORATION (414) 642-7200
;       SEPTEMBER 23, 1996.
;
;
;
;
;       DEFINE THE EXTERNAL VARIABLES
;
;
;           FIRST, DO THE 8051GB EXTENSIONS AND PORT DEFINITIONS IN REG51GB.ASM
;
            EXTERN ACON(NUMBER)
        EXTERN  ADRES2 (NUMBER)
        EXTERN  ADRES3 (NUMBER)
        EXTERN  ADRES4 (NUMBER)
            EXTERN AOVER( NUMBER)
            EXTERN   AUNDER (NUMBER)
            EXTERN BOVER(NUMBER)
            EXTERN   BUNDER (NUMBER)
            EXTERN COVER (NUMBER)
            EXTERN   CUNDER (NUMBER)
            EXTERN SPARE2 (NUMBER)
            EXTERN PROBLEM (NUMBER)
;
;           NOW, DO THE CONSTANTS DEFINED IN 51START.ASM
;
            EXTERN NREADINGS (NUMBER)
            EXTERN OVERVOLT (NUMBER)
            EXTERN STARTREAD (NUMBER)
            EXTERN UNDERVOLT (NUMBER)
            EXTERN WDTRST (NUMBER)
        EXTERN  SUMA0 (DATA)
        EXTERN  SUMA1 (DATA)
        EXTERN  SUMA2 (DATA)
        EXTERN  SUMB0 (DATA)
        EXTERN  SUMB1 (DATA)
        EXTERN  SUMB2 (DATA)
        EXTERN  SUMC0 (DATA)
        EXTERN  SUMC1 (DATA)
        EXTERN  SUMC2 (DATA)
        EXTERN  TEMPCHAR(DATA)
            EXTERN UTILITYOK (DATA)
            EXTERN INCLED(BIT)
        DEFSEG MAINCODE, START=100H, CLASS=CODE
        SEG MAINCODE
;
;           THIS IS THE INPUT FROM AN INTERUPT
;
;
RMSSTART:   PUSH ACC            ;STORE ACC
            PUSH PSW            ;STORE PROG STAT WORD
;           PUSH DPH            ;DATA POINTER HIGH
;           PUSH DPL            ;DATA POINTER LOW
                MOV     WDTRST,#0E1H  ;TOGGLE WATCH DOG TIMER
                CLR     SPARE2        ;OFF WITH SPARE 2
                SETB    INCLED        ;SET BIT TO SAY WE DID AN ANALOG
                MOV     ACON, #010H   ;OFF WITH INTERUPT FLAG
                MOV     UTILITYOK,#0  ; SAY THAT WE ARE OK
;
;       TO GET HERE TAKES 12 TO 18uS
;       DOING THE CALCULATION FOR ONE PHASE STARTING HERE THRU
;       FINISHA TAKES AN ADDITIONAL 55uS
;
;       PHASES ARE CALCULATED B-C-A BECAUSE THE READING OF THE

```
04/21/1997   13:55        Filename: ANAINT.ASM

;       A/D IS FARTHER FROM THE GETTING OF THE DATA SO WE DONT
;       HAVE ANY OVERLAP PROBLEMS
;       IT TAKES 29-35uS TO GET TO FIRST A/D READING, 74-86uS FOR
;       THE SECOND A/D, AND 119-137uS FOR THE LAST READING. THE
;       ENTIRE ROUTINE TAKES 158-192uS. ACH2 IS READ AT 78uS AFTER
;       THE INTERUPT, ACH3 IS READ 104uS AFTER THE INTERUPT, AND
;       ACH4 IS READ 130uS AFTER THE INTERUPT. THIS WAS CALCULATED
;       BY D. PORTER ON SEPTEMBER 26, 1996.
;
;
;       B PHASE CALCULATION
;       START BY SQUARING THE OLD READING
;
                MOV     A,@R0       ;LOAD LAST READING
                MOV     B,A                     ;COPY TO B
                MUL     AB                      ;SQUARE THE READING
;
;       NOW SUBTRACT OLD READING FROM SUM
;
                CLR     C                       ; FOR SUBTRACT
                MOV     TEMPCHAR;A   ;MOVE A TO TEMP
                MOV     A,SUMB0 ;LSB OF SUMB
                SUBB    A, TEMPCHAR     ;SUBTRACT LSB OF SQUARED VALUE
                MOV     SUMB0,A ;STORE LSB
                MOV     A,SUMB1 ;LOAD MIDDLE BYTE
                SUBB    A, B                    ;SUBTRACT MSB OF SQUARED VALUE
                MOV     SUMB1,A ;STORE RESULT
                MOV     A,SUMB2 ;LOAD MSB
                SUBB    A, #0           ;SUBTRACT THE CARRY
                MOV     SUMB2,A ;STORE RESULT
;
;       LOAD ANALOG DATA AND STORE
;
                MOV     A, ADRES3       ;LOAD RESULT OF ANALOG
                MOV     @R0,A    ;STORE FOR LATER
;
;       NOW SQUARE THE CURRENT READING AND ADD TO RUNNING SUM
;
                MOV     B,A                     ;READY FOR SQUAREING
                MUL     AB                      ;SQUARE THE VALUE
                ADD     A,SUMB0 ;ADD LSB TO LSB
                MOV     SUMB0, A ;STORE RESULT
                MOV     A,B                     ;LOAD MSB
                ADDC    A,SUMB1 ;ADD MIDDLE BYTE
                MOV     SUMB1,A ;STORE MIDDLE BYTE
                MOV     A,#0            ;ADD THE CARRY TO MSB
                ADDC    A, SUMB2 ;ADD THE CARRY
                MOV     SUMB2,A ;DONE WITH CALCULATION
;
;       CHECK FOR OVER RANGE
;
                CLR     C                       ;CLEAR THE CARRY
                ANL     A,#11110000B    ;CLEAR LOW NIBBLE
                JNZ     OVERB.          ;JUMP TO OVER SECTION
;
;       NOW TAKE LOW NIBBLE OF MSB AND HIGH NIBBLE OF MIDDLE
;       AND MAKE INTO ONE BYTE (SHIFT RIGHT 3 NIBBLES)
;
                MOV     A,SUMB1 ;LOAD MIDDLE BYTE
                SWAP    A                       ;SWAP NIBBLES SO HIGH CAN BE LOW
                ANL     A,#00001111B    ;CLEAR THE HIGH NIBBLE
                MOV     B,A                     ,STORE IN B
                MOV     A,SUMB2 ;LOAD HIGH BYTE
                SWAP    A                       ;GET LOW NIBBLE AND PUT IN HIGH
                ADD     A,B                     ;ADD LOW AND HIGH NIBBLES
                MOV     B,A                     ,STORE RESULT IN B
;
;       NOW DO COMPARE'S FOR OVER AND UNDER
;
                CLR     C                       ;READY FOR SUBTRACT
                SUBB    A, #UNDERVOLT   ;SUBTRACT THE UNDER VOLTAGE VALUE
                JC      UNDERB  ;GOTO UNDER VOLTAGE SECTION
                MOV     A,B                     ;RELOAD DATA
                SUBB    A, #OVERVOLT    ;SUBTRACT THE OVER VOLTAGE
                JC      FINISHB ;IF NO CARRY, WE ARE NOT OVER
```

04/21/1997   13:55        Filename: ANAINT.ASM

```
;       NEXT IS WE ARE OVER VOTLAGE SECTION
;
OVERB:  ORL     UTILITYOK, #00000100B   ;SET B OVER VOLTGAE
                SETB    OVERB ;SET OVER VOLTAGE A BIT
                CLR     PROBLEM ;SHOW PROBLEM
                JMP     FINISHB ;FINISH THE SECTION
;
;       UNDER VOLTAGE SECTION
;
UNDERB: ORL     UTILITYOK,#00001000B    ;SET B UNDER VOLTAGE
                SETB    UNDERB ;SET UNDER VOLTAGE BIT
                CLR     PROBLEM ;SHOW PROBLEM
;
;       FINISH UP A PHASE
;
FINISHB:        INC     R0              ;NEXT READING
;
;
;
;
;
;
;       C PHASE CALCULATION
;       START BY SQUARING THE OLD READING
;
                MOV     A,@R0   ;LOAD LAST READING
                MOV     B,A             ;COPY TO B
                MUL     AB              ;SQUARE THE READING
;
;       NOW SUBTRACT OLD READING FROM SUM
;
                CLR     C               ;FOR SUBTRACT
                MOV     TEMPCHAR,A      ;MOVE A TO TEMP
                MOV     A,SUMC0 ;LSB OF SUMA
                SUBB    A, TEMPCHAR     ;SUBTRACT LSB OF SQUARED VALUE
                MOV     SUMC0,A ;STORE LSB
                MOV     A,SUMC1 ;LOAD MIDDLE BYTE
                SUBB    A,B             ;SUBTRACT MSB OF SQUARED VALUE
                MOV     SUMC1,A ;STORE RESULT
                MOV     A,SUMC2 ;LOAD MSB
                SUBB    A, #0           ;SUBTRACT THE CARRY
                MOV     SUMC2, A ;STORE RESULT
;
;       LOAD ANALOG DATA AND STORE
;
                MOV     A, ADRES4       ;LOAD RESULT OF ANALOG
                MOV     @R0,A   ;STORE FOR LATER
;
;       NOW SQUARE THE CURRENT READING AND ADD TO RUNNING SUM
;
                MOV     B,A             ;READY FOR SQUAREING
                MUL     AB              ;SQUARE THE VALUE
                ADD     A,SUMC0 ;ADD LSB TO LSB
                MOV     SUMC0,A ;STORE RESULT
                MOV     A,B             ;LOAD MSB
                ADDC    A, SUMC1 ;ADD MIDDLE BYTE
                MOV     SUMC1,A ;STORE MIDDLE BYTE
                MOV     A,#0            ;ADD THE CARRY TO MSB
                ADDC    A, SUMC2 ;ADD THE CARRY
                MOV     SUMC2 , A ;DONE WITH CALCULATION
;
;       CHECK FOR OVER RANGE
;
                CLR     C               ;CLEAR THE CARRY
                ANL     A,#11110000B    ;CLEAR LOW NIBBLE
                JNZ     OVERC   ;JUMP TO OVER SECTION
;
;       NOW TAKE LOW NIBBLE OF MSB AND HIGH NIBBLE OF MIDDLE
;       AND MAKE INTO ONE BYTE (SHIFT RIGHT 3 NIBBLES)
;
                MOV     A,SUMC1 ;LOAD MIDDLE BYTE
                SWAP    A               ;SWAP NIBBLES SO HIGH CAN BE LOW
                ANL     A,#00001111B    ;CLEAR THE HIGH NIBBLE
                MOV     B,A             ;STORE IN B
                MOV     A, SUMC2 ;LOAD HIGH BYTE
```

04/21/1997  13:55      Filename: ANAINT.ASM

```
                SWAP    A               ;GET LOW NIBBLE AND PUT IN HIGH
                ADD     A,B             ;ADD LOW AND HIGH NIBBLES
                MOV     B,A             ;STORE RESULT IN B
;
;       NOW DO COMPARE'S FOR OVER AND UNDER
;
                CLR     C               ;READY FOR SUBTRACT
                SUBB    A,#UNDERVOLT    ;SUBTRACT THE UNDER VOLTAGE VALUE
                JC      UNDERC  ;GOTO UNDER VOLTAGE SECTION
                MOV     A,B             ;RELOAD DATA
                SUBB    A, #OVERVOLT    ;SUBTRACT THE OVER VOLTAGE
                JC      FINISHC ;IF NO CARRY, WE ARE NOT OVER
;
;       NEXT IS WE ARE OVER VOLTAGE SECTION
;
OVERC: ORL      UTILITYOK,#00010000B    ;SET C OVER VOLTGAGE
;               SETB    OVERC   ;SET OVER VOLTAGE A BIT
                CLR     PROBLEM ;SHOW PROBLEM
                JMP     FINISHC ;FINISH THE SECTION
;
;       UNDER VOLTAGE SECTION
;
UNDERC: ORL     UTILITYOK,#00100000B    ;SET C UNDER VOLTAGE
                SETB    UNDERC  ;SET UNDER VOLTAGE BIT
                CLR     PROBLEM ;SHOW PROBLEM
;
;       FINISH UP A PHASE
;
FINISHC:        INC     R0              ;NEXT READING
;
;       FINALLY, DO THE A PHASE
;
                MOV     A,@R0   ;LOAD LAST READING
                MOV  B,A                ;COPY TO B
                MUL     AB              ;SQUARE THE READING
;
;       NOW SUBTRACT OLD READING FROM SUM
;
                CLR     C               ;FOR SUBTRACT
                MOV     TEMPCHAR,A      ;MOVE A TO TEMP
                MOV     A,SUMA0 ;LSB OF SUMA
                SUBB    A, TEMPCHAR     ;SUBTRACT LSB OF SQUARED VALUE
                MOV     SUMA0,A ;STORE LSB
                MOV     A,SUMA1 ;LOAD MIDDLE BYTE
                SUBB    A,B             ;SUBTRACT MSB OF SQUARED VALUE
                MOV     SUMA1,A ;STORE RESULT
                MOV     A,SUMA2 ;LOAD MSB
                SUBB    A, #0           ;SUBTRACT THE CARRY
                MOV     SUMA2,A ;STORE RESULT
;
;       LOAD ANALOG DATA AND STORE
;
                MOV     A,ADRES2        ;LOAD RESULT OF ANALOG
                MOV     @R0,A   ;STORE FOR LATER
;
;       NOW SQUARE THE CURRENT READING AND ADD TO RUNNING SUM
;
                MOV     B,A             ;READY FOR SQUAREING
                MUL     AB              ;SQUARE THE VALUE
                ADD     A, SUMA0 ;ADD LSB TO LSB
                MOV     SUMA0,A ;STORE RESULT
                MOV     A,B             ;LOAD MSB
                ADDC    A,SUMA1 ;ADD MIDDLE BYTE
                MOV     SUMA1,A ;STORE MIDDLE BYTE
                MOV     A,#0            ;ADD THE CARRY TO MSB
                ADDC    A,SUMA2 ;ADD THE CARRY
                MOV     SUMA2,A ;DONE WITH CALCULATION
;
;       CHECK FOR OVER RANGE
;
                CLR     C               ;CLEAR THE CARRY
                ANL     A,#11110000B    ;CLEAR LOW NIBBLE
                JNZ     OVERA           ;JUMP TO OVER SECTION
;
;       NOW TAKE LOW NIBBLE OF MSB AND HIGH NIBBLE OF MIDDLE
;       AND MAKE INTO ONE BYTE (SHIFT RIGHT 3 NIBBLES)
;
                MOV     A,SUMA1 ;LOAD MIDDLE BYTE
```

04/21/1997  13:55     Filename: ANAINT.ASM

```
            SWAP    A                     ;SWAP NIBBLES SO HIGH CAN BE LOW
            ANL     A,#00001111B          ;CLEAR THE HIGH NIBBLE
            MOV     B,A                   ;STORE IN B
            MOV     A,SUMA2 ;LOAD HIGH BYTE
            SWAP    A                     ;GET LOW NIBBLE AND PUT IN HIGH
            ADD     A,B                   ;ADD LOW AND HIGH NIBBLES
            MOV     B,A                   ;STORE RESULT IN B
;
;      NOW DO CDMPARE'S FOR OVER AND UNDER
;
            CLR     C                     ;READY FOR SUBTRACT
            SUBB    A, #UNDERVOLT         ;SUBTRACT THE UNDER VOLTAGE VALUE
            JC      UNDERA    ;GOTO UNDER VOLTAGE SECTION
            MOV     A,B                   ;RELOAD DATA
            SUBB    A, #OVERVOLT          ;SUBTRACT THE OVER VOLTAGE
            JC      FINISHA ;IF NO CARRY, WE ARE NOT OVER
;
;      NEXT IS WE ARE OVER VOTLAGE SECTION
;
OVERA: ORL         UTILITYOK,#00000001B   ;A PHASE OVER VOLTAGE
            SETB    OVERA ;SET OVER VOLTAGE A BIT
            CLR     PROBLEM ;SHOW PROBLEM
            JMP     FINISHA ;FINISH THE SECTION
;
;      UNDER VOLTAGE SECTION
;
UNDERA: ORL        UTILITYOK,#00000010B   ;A PHASE UNDER VOLTAGE
            SETB    UNDERA ;SET UNDER VOLTAGE BIT
            CLR     PROBLEM ;SHOW PROBLEM
;
;      FINISH UP A PHASE
;
FINISHA:    INC     R0                    ;NEXT READING
            MOV     A,#NREADINGS          ;LOAD READING
            XRL     A,R0                  ;IF SAME, A=0
            JNZ     FINISH2 ;NOT SAME
            MOV     R0,#STARTREAD         ;RELOAD WITH READING 1
;
;      END OF ROUTINE
;
;           POP     DPL                   ;RELOAD DATA POINTHR LOW
;           POP     DPH                   ;RELOAD DATA POINTER HIGH
FINISH2:    POP     PSW                   ;RELOAD PROGRAM STATUS WORD
            POP     ACC                   ;RELOAD ACCUMULATOR
            RETI                          ;RETURN FROM INTERUPT
      END
```

I claim:

1. A method of switching a main electrical AC power supply to a standby electrical AC power supply, the method comprising the steps of:
   a) sampling an instantaneous voltage magnitude of a main power supply waveform for a plurality of sampling periods at a preselected sampling rate;
   b) squaring each instantaneous voltage magnitude in real time to create respective instantaneous squared voltage values;
   c) generating a running voltage value by accumulating the instantaneous squared voltage values for an accumulation window of time, wherein the running voltage value is adjusted in real time by subtracting the instantaneous square voltage value for the sampling period immediately prior to the start of the accumulation window from the running voltage value and adding the instantaneous square voltage value for the most recent sampling period to the running voltage value;
   d) comparing the running voltage value to a preselected under-voltage threshold value; and
   e) switching to the standby electrical AC power supply when the running voltage value sags to or below the preselected under-voltage threshold value.

2. A method as recited in claim 1 wherein the running voltage value is generated by accumulating the instantaneous squared voltage values over integer multiples of the main power supply waveform half-cycle.

3. A method as recited in claim 2 wherein the preselected under-voltage threshold value is approximately the number of samples per accumulation window multiplied by 0.81.

4. A method as recited in claim 2 wherein the preselected sampling rate is approximately 40 samples per half-cycle of the main power supply waveform.

5. A method as recited in claim 1 wherein the running voltage value is generated by accumulating the instantaneous squared voltage values over approximately one half-cycle for the main power supply waveform.

6. A method as recited in claim 1 wherein the running voltage value is generated by accumulated the instantaneous squared voltage values over approximately two half-cycles for the main power supply waveform.

7. A method as recited in claim 1 further comprising the steps of:
   comparing the running voltage value to a preselected over-voltage threshold value; and
   switching to the standby electrical AC power supply when the running voltage value swells to or exceeds the preselected over-voltage threshold value.

8. A method as recited in claim 7 wherein:
the running voltage value is generated by accumulating the instantaneous squared voltage values over integer multiples for the main power supply waveform half-cycle; and
the preselected over-voltage threshold value is approximately the number of samples per accumulation window multiplied by 1.21.

9. A method as recited in claim 1 wherein the main electrical AC power supply is single phase.

10. A method as recited in claim 1 wherein the main electrical power supply is three-phase and steps a) through e) are performed independently for each phase.

11. A method as recited in claim 1 wherein sampling step a) includes:
tapping a voltage signal from a power line for the main electrical AC power supply;
isolating the tapped voltage signal with an isolation transformer; and
scaling the isolated voltage signal to form a sinusoidal waveform having a preselected peak voltage.

12. A method as recited in claim 11 wherein the preselected peak voltage is 4 volts.

13. A method as recited in claim 11 wherein the sampling step a) further includes:
rectifying the sinusoidal waveform to form a half wave rectified sinusoidal waveform having a preselected peak voltage.

14. A method as recited in claim 13 wherein the sampling step a) further includes:
converting the half wave rectified sinusoidal waveform into digital data using an 8-bit A/D converter.

15. A method as recited in claim 1 wherein a static switch is located in the main electrical AC power supply line and the switching step e) includes:
transmitting a disturbance detection signal to the standby power supply to activate the standby power supply and contemporaneously to the static switch to disable the main electrical AC power supply.

16. A detector for monitoring voltage disturbances in electrical AC power lines, the detector comprising:
an isolation transformer that outputs an isolated voltage signal in response to voltage in the electrical AC power line;
a system controller including:
a system clock;
a sampling element that receives the isolated voltage signal from the isolation transformer and outputs a plurality of digital values at a system sampling rate, each digital value representing an instantaneous voltage magnitude value for the isolated voltage signal at the respective sampling rate;
a squaring element that squares each instantaneous voltage magnitude value during the respective sampling to form an instantaneous squared voltage value in real time;
an accumulating element that generates a running voltage value by accumulating the instantaneous squared voltage values for an accumulation window of time, wherein the running voltage value is adjusted in real time by subtracting the instantaneous squared voltage values for a sampling period immediately prior to the start of the accumulation window from the running voltage value and adding the instantaneous squared voltage value for the most recent sampling period to the running voltage value; and a first comparing element that compares the running voltage value to an under-voltage threshold value and outputs a disturbance detection signal when the running voltage value sags to or below the under-voltage threshold value.

17. A detector as recited in claim 16 wherein the first comparing element compares the running voltage value to the under-voltage threshold value in real time for each sampling period.

18. A detector as recited in claim 16 further comprising a second comparing element that compares the running voltage value to an over-voltage threshold value and outputs a disturbance detection signal when the running voltage value swells to or exceeds the over-voltage threshold value.

19. A detector as recited in claim 18 wherein the second comparing element compares the running voltage value to the over-voltage threshold value in real time for each sampling period.

20. A detector as recited in claim 16 wherein the sampling element includes:
a voltage scaling circuit that inputs the isolated voltage signal and outputs a sinusoidal waveform having a preselected peak voltage;
a rectifier that inputs a sinusoidal waveform having a preselected peak voltage and outputs a half wave rectified sinusoidal waveform with the preselected peak voltage; and
an A/D converter that converts the half wave rectified sinusoidal waveform into the digital values representing the instantaneous voltage magnitude values for the isolated voltage signal at the respective sampling period.

21. A detector as recited in claim 20 wherein the A/D converter is an 8-bit converter.

22. A detector for monitoring voltage disturbance in electrical AC power lines, the detector comprising:
an isolation transformer that outputs an isolated voltage signal in response to voltage in an electrical AC power line; and
a system controller having a system clock, a sampling element, a microprocessor, and memory, wherein the sampling element receives the isolated voltage signal from the isolation transformer and outputs a plurality of digital values at a system sampling rate, each digital value representing an instantaneous voltage magnitude value for the isolated voltage signal at each respective sampling period and further wherein the memory contains software that instructs the microprocessor to implement the following steps:
squaring each instantaneous voltage magnitude in real time to create respective instantaneous squared voltage values;
generating a running voltage value by accumulating the instantaneous squared voltage values for an accumulation window of time, wherein the running voltage value is adjusted in real time by subtracting the instantaneous squared voltage values for the sampling period immediately prior to the start of the accumulation window from the running voltage value and adding the instantaneous squared voltage value for the most recent sampling period to the running voltage value;
comparing the running voltage value to a preselected under-voltage threshold value; and
outputting a disturbance detection signal when the running voltage value sags to or below the under-voltage threshold value.

23. A detector as recited in claim 22 wherein the microprocessor also implements the steps of:

comparing the running voltage value to a preselected over-voltage threshold value; and outputting a disturbance detection signal when the running voltage value swells to or exceeds the over-voltage threshold value.

24. A detector as recited in claim 22 wherein the sampling element includes:

a voltage scaling circuit that inputs the isolated voltage signal and outputs a sinusoidal waveform having a preselected peak voltage;

a rectifier that inputs a sinusoidal waveform having a preselected peak voltage and outputs a half wave rectified sinusoidal waveform with the preselected peak voltage; and an A/D converter that converts the half wave rectified sinusoidal waveform into the digital values representing the instantaneous voltage magnitude values for the isolated voltage signal at the respective sampling period.

25. A switching mechanism for an uninterruptable power supply comprising:

a main electrical AC power supply line;

a static switch in the main power supply line;

a standby electrical AC power supply;

an isolation transformer that outputs an isolated voltage signal in response to voltage in the electrical AC power line;

means for sampling the isolated voltage signal at a system sampling rate and generating a digital value representing the instantaneous voltage magnitude for each respective sampling period;

a microprocessor;

memory containing software that instructs the microprocessor to implement the following steps:

squaring each instantaneous voltage magnitude in real time to create respective instantaneous squared voltage values;

generating a running voltage value by accumulating the instantaneous squared voltage values for an accumulation window of time, wherein the running voltage value is adjusted in real time by subtracting the instantaneous squared voltage values for the sampling period immediately prior to the start of the accumulation window from the running voltage value and adding the instantaneous squared voltage values for the most recent sampling period to the running voltage value;

comparing the running voltage value to a preselected under-voltage threshold value; and transmitting a disturbance detection signal when the running voltage value sags to or below the under-voltage threshold value to the standby power supply to activate the standby power supply and contemporaneously to the static switch to disable the main electrical AC power line.

26. The switching mechanism as recited in claim 25 wherein the memory contains software that instructs the microprocessor to implement the following additional steps:

comparing the running voltage value to a preselected over-voltage threshold value; and transmitting a disturbance detection signal when the running voltage value swells to or exceeds the over-voltage threshold value to the standby power supply to activate the standby power supply and contemporaneously to the static switch to disable the main electrical AC power line.

27. A method of detecting a power disturbance in a main electrical AC power supply, the method comprising the steps of:

a) sampling the instantaneous voltage magnitude of a main power supply waveform for a plurality of sampling periods at a preselected sampling rate;

b) squaring each instantaneous voltage magnitude in real time to create respective instantaneous squared voltage values;

c) generating an average RMS voltage value by summing the instantaneous squared voltage values for a preselected number of sampling periods and dividing the sum of the instantaneous squared voltage values by the number of sampling periods;

d) comparing the average RMS voltage value to a preselected under-voltage threshold value defined by multiplying the number of sampling periods used to determine the average RMS voltage value by the square of a normalized voltage tolerance for a critical load receiving power from the main electrical AC power supply; and e) outputting a disturbance detection signal when the average RMS voltage value sags to or below the under-voltage threshold value.

28. A method of detection as recited in claim 27 further comprising the step of comparing the average RMS voltage value to a preselected over-voltage threshold value defined by multiplying the number of sampling periods used to determine the average RMS voltage value by the square of a normalized voltage tolerance for a critical load receiving power from the main electrical AC power supply.

29. A method of detection as recited in claim 28 further comprising the step of outputting a disturbance detection signal when the average RMS voltage value swells to or exceeds the over-voltage threshold value.

* * * * *